No. 888,737. PATENTED MAY 26, 1908.
C. T. PRATT.
AUTOMOBILE RUNNING GEAR.
APPLICATION FILED JAN. 24, 1907.
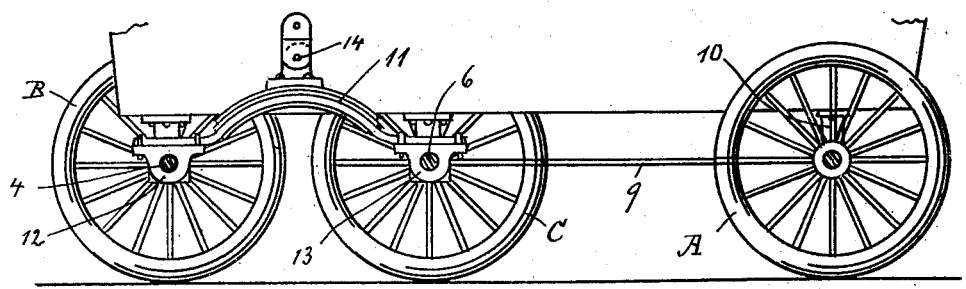
Fig. 1.
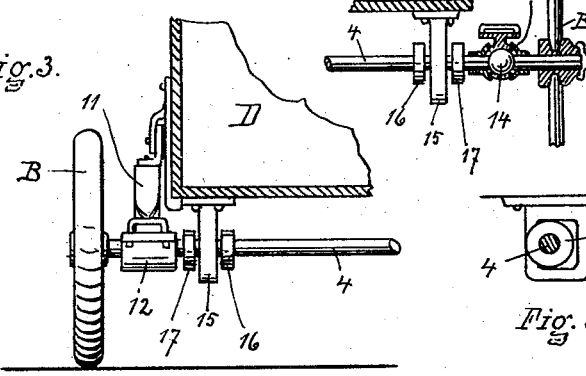
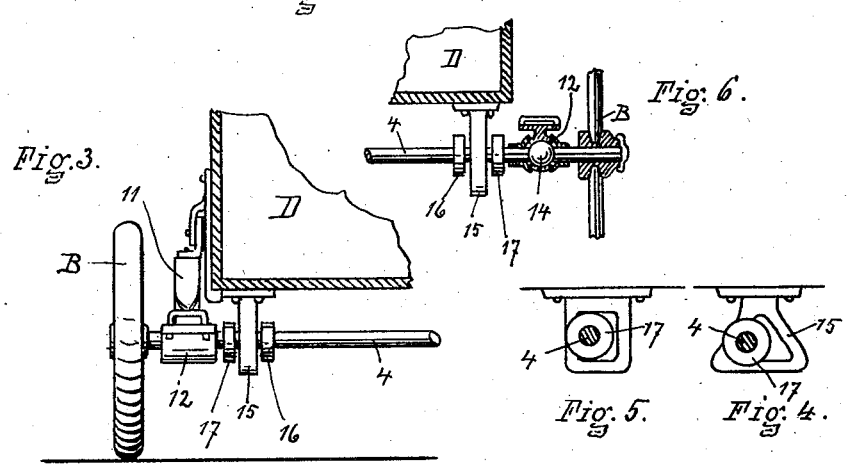
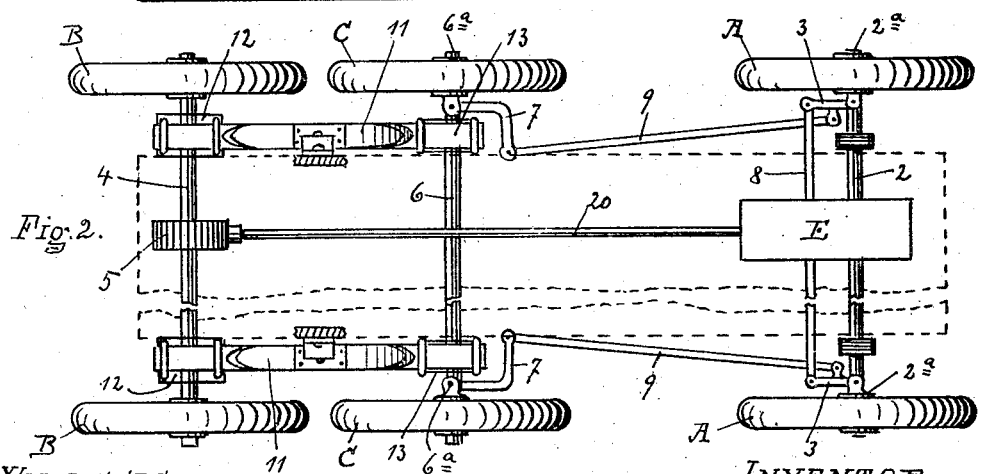
WITNESSES.
Rich. A. George
S. E. Clark.
INVENTOR
CHARLES T. PRATT
BY Robinson, Martin & Jones
ATTORNEYS.

UNITED STATES PATENT OFFICE.

CHARLES T. PRATT, OF FRANKFORT, NEW YORK.

AUTOMOBILE RUNNING-GEAR.

No. 888,737.  Specification of Letters Patent.  Patented May 26, 1908.

Application filed January 24, 1907. Serial No. 353,890.

*To all whom it may concern:*

Be it known that I, CHARLES T. PRATT, of Frankfort, in the county of Herkimer and State of New York, have invented certain new and useful Improvements in Automobile Running-Gear; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide an improved running gear for automobiles, whereby the body may be supported and carried in a better manner, and which running gear has features of mobility which aid in accomplishing that end, and obviate to a large extent binding and straining in the running gear.

Figure 1 shows a side elevation of a running gear embodying the features of my present construction, except that the rear wheels on the near side have been removed to better exhibit the construction. Fig. 2 is a plan view of the running gear with parts of the driving mechanism included, a section being removed to reduce the size of the figure laterally. Fig. 3 is a detail view showing portions of the running gear and portions of the body and section. Fig. 4 is a detail of an axle guide and retainer. Fig. 5 is a detail of a modified form of construction of the same. Fig. 6 is a detail of certain features of the construction.

Referring to the reference letters and figures in a more particular description, A—A indicate the forward pair of carrying and steering wheels.

B—B indicate the rear pair of non-steerable driving wheels.

C—C indicate an intermediate pair of carrying and steerable wheels.

The forward pair of wheels A are supported on the outer ends of the forward axle 2 by the jointed extensions 2ª provided with the usual bell crank arm 3 for connecting the steering mechanism. The wheels B are secured on the opposite ends of the axle 4, which axle will ordinarily be in two halves connecting in the differential gear casing 5 in the usual manner. The pair of wheels C are mounted on the ends of the axle 6 by means of the usual jointed extensions 6ª, which extensions are jointed on a vertical pivot in the usual manner and are provided with arms 7 for the attachment of the steering mechanism. The arms 3 on opposite sides of the machine are connected by a bar 8 in the usual manner, and the arms 7 and 3 on the same side of the machine are connected by bars 9 in such manner that when the forward wheels A are turned the wheels C will turn in a similar direction only at a less angle.
The other details of the steering mechanism being common and subject to many modifications may be omitted. The forward end of the body D may be supported on the forward axle 2 by a spring 10 in any of the usual manners. The rear end of the body is supported by a half elliptical spring 11 at either side of the body, and adjacent to the wheels engages with the axles 4 and 6 respectively by bearings 12 and 13. The crown of the spring 11 supports the body preferably by being pivotally connected therewith, as indicated at 14. The axle 4 at the box 12 is provided with a ball-shaped enlargement 14, and the box 12 is arranged to fit the ball 14 in the manner shown in Fig. 6, whereby provision is not only made for the rotation of the axle 4, but provision is also made for a flexibility as when the axle 4 may raise or lower as the wheel B passes over a projection or through a depression in the road. The box 13 is provided with a similar rolling joint, but the axle is not allowed to rotate.

In order to obviate lateral movement of the body with reference to the axles 4 and 6, there is provided secured to the body an axle guide and retainer 15 having an opening through which the axle passes, and which guide and retainer is preferably of the form shown in Figs. 4 or 5, having an enlarged opening allowing some range of movement in both a lateral and vertical direction for the axle. At each side of the guide and retainer there are provided enlargements 16 and 17 on the axle. These enlargements 16 and 17 are of a size to prevent their ever passing through the opening which receives the axle in the axle guide and retainer, whereby lateral movement of the body with reference to the axle is prevented, and the body is caused to ride squarely on the springs 11. The vertical play of the axle in the guide and retainer allows the axle to move up and down to a limited extent as the wheel passes over a projection or through a depression in the road. In case of an excessive depression, the wheel might be carried over the depression without passing entirely to the bottom of it, as the retainer would support the axle and wheel after it had made a limited downward movement. By limiting the downward movement of either one or the other of the axles 4 or 6 when the wheels are not supported, the other pair of wheels is enabled to carry the load, the spring 11 canting only to a limited extent under these circumstances.

In Fig. 2 the motor or engine is indicated by E and the transmission shaft 20 extends from the motor to the usual differential gear provided in the casing 5 on the rear axle.

What I claim as new and desire to secure by Letters Patent is:

1. The combination in an automobile running gear of a pair of forward steerable wheels secured by pivotal joints to the ends of an axle and carrying the forward end, a truck consisting of an intermediate pair of steerable wheels secured by pivotal joints on the ends of an intermediate axle and a pair of non-steerable wheels secured to the ends of the rear axle and half elliptical springs extending longitudinally of the running gear on each side and secured to the intermediate and rear axle at their respective ends and means for supporting the rear of the body from said truck engaging on the middle portion of said springs respectively, substantially as set forth.

2. The combination in an automobile running gear having two pairs of wheels supporting one end of the body, axles connecting said pairs of wheels, a pair of half-elliptical springs connecting said axles, a body supported on said elliptical springs, and an axle guide and retainer engaging with said axle, substantially as set forth.

3. The combination in a running gear for automobiles of two pairs of wheels and axles for each pair supporting by interposed springs one end of the body, axle guides secured to the body and engaging respectively with each axle, substantially as set forth.

4. The combination in a running gear for automobiles of two pairs of wheels and axles therefor respectively, a body supported at one end by interposed springs, each spring supported in part on each axle, and an axle guide and retainer for each axle secured to the body and engaging with the axle, substantially as set forth.

In witness whereof I have affixed my signature, in presence of two witnesses, this 15 day of January 1907.

CHARLES T. PRATT.

Witnesses:
C. D. PHILLIPS,
EMMA S. HESSE.